(12) United States Patent
Itoi et al.

(10) Patent No.: US 6,640,791 B2
(45) Date of Patent: Nov. 4, 2003

(54) EGR VALVE CONTROL APPARATUS

(75) Inventors: Makoto Itoi, Toyko (JP); Tsuneo Tanabe, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 264 days.

(21) Appl. No.: 09/921,690

(22) Filed: Aug. 6, 2001

(65) Prior Publication Data

US 2002/0112709 A1 Aug. 22, 2002

(30) Foreign Application Priority Data

Feb. 21, 2001 (JP) ........................................ 2001-045496

(51) Int. Cl.[7] .............................................. F02M 25/07
(52) U.S. Cl. .................................. 123/568.23; 318/696
(58) Field of Search ........................... 123/681, 568.21, 123/568.23, 568.24; 251/129.11, 129.12, 129.13; 318/696, 264, 265

(56) References Cited

U.S. PATENT DOCUMENTS

| | | | | |
|---|---|---|---|---|
| 5,501,201 A | * | 3/1996 | Miyoshi et al. | 123/568.24 |
| 5,606,957 A | * | 3/1997 | Feucht | 123/568.23 |
| 5,937,835 A | * | 8/1999 | Turner et al. | 123/568.24 |
| 6,073,619 A | * | 6/2000 | Baranowski | 123/681 |
| 6,098,602 A | * | 8/2000 | Martin et al. | 123/568.23 |
| 6,102,016 A | * | 8/2000 | Sitar et al. | 123/568.23 |
| 6,216,677 B1 | * | 4/2001 | McConnell et al. | 123/568.24 |

FOREIGN PATENT DOCUMENTS

| | | |
|---|---|---|
| JP | 2590956 | 12/1996 |
| JP | 2870354 | 1/1999 |

\* cited by examiner

*Primary Examiner*—Willis R. Wolfe
(74) *Attorney, Agent, or Firm*—Sughrue Mion, PLLC

(57) ABSTRACT

An EGR valve control apparatus is provided which is capable of controlling an amount of exhaust gas to be recirculated in a precise and proper manner by using a step motor, as well as improving the durability of an EGR valve. The EGR valve control apparatus adjusts an opening of the EGR valve for opening and closing an exhaust gas recirculation passage connecting between an exhaust passage and an intake passage by means of the step motor. The apparatus includes a hysteresis-provided drive control section for driving the step motor in accordance with the target position and performing control with hysteresis of two steps or more so as to hold the position of the step motor when a difference between the target position and the current position of the step motor is equal to or less than a prescribed n steps which is equal to or greater than two steps, and a forced drive control section for driving the step motor to the target position thereof while stopping the hysteresis-provided control when a deviation between the target position and the current position of the step motor remains for a predetermined period of time.

4 Claims, 3 Drawing Sheets

EGR VALVE CONTROL APPARATUS

This application is based on Application No. 2001-45496, filed in Japan on Feb. 21, 2001, the contents of which are hereby incorporated by reference.

BACKGROUND OF THE INVENTION

1. Field of the Invention

The present invention relates to an exhaust gas recirculation (EGR) system for an internal combustion engine, and more specifically, to improvements in such an EGR valve control apparatus.

2. Description of the Related Art

Conventionally, in automotive engines, etc., there has been provided an exhaust gas recirculation system, so-called EGR (exhaust gas recirculation) apparatus, for recirculating exhaust gas into an air fuel mixture sucked into an internal combustion engine in order to reduce the generation of NOx and the like which are harmful components in the exhaust gas.

However, recirculation of an improper amount of exhaust gas results in reduction in the engine output power and instability in the combustion (decreased engine rotation, tardiness, etc.), causing an deterioration in driveability. Thus, in order to reduce these problems, it is necessary to control the amount of exhaust gas to be recirculated (EGR amount) according to the operating conditions.

In this case, to control the EGR amount in accordance with the operating conditions of the engine, a control valve (EGR valve) is provided on an exhaust gas recirculation passage connecting between an intake passage and an exhaust passage of the engine.

An exhaust gas recirculation apparatus is known which includes a step motor as actuator for driving such an EGR valve. Target values for the EGR amount are determined in advance in accordance with the engine operating conditions so as to properly balance the output performance and the exhaust performance of the engine with each other. A target EGR amount suited to the current engine operating conditions is determined by referring to a map of such target values. This target EGR amount is then converted into a corresponding control command value, which is in turn output to the step motor, so that the amount of driving of the step motor immediately follows the target EGR amount (the control command value).

The target EGR value is determined based on the charging efficiency and the number of revolutions per unit time of the engine. The rotational angle of the step motor changes in a stepwise manner or in a plurality of steps, but if the rotational angle of the step motor is always controlled to follow the number of revolutions per unit time of the engine, etc., there might be caused frequent opening and closing of the EGR valve, so such control is disadvantageous in respect of durability. To suppress this phenomenon, in the past, control with hysteresis is carried out in such a manner that the position of the step motor is not changed unless a difference between the target position and the current position of the step motor is two steps or greater (i.e., with hysteresis of one step).

In such control by the known EGR valve control apparatus, however, the current position of the step motor remains deviated from the target position thereof under the hysteresis control as long as the difference between the calculated target position and the detected current position of the step motor is less than two steps (hysteresis of one step), thus posing a problem from a point of view of accurate control.

In addition, the hysteresis of one step in the known hysteresis control is not necessarily satisfactory, and hence the EGR valve might be frequently caused to open and close due to a change in the number of revolutions per unit time of the engine, etc., thus posing another problem from a point of view of durability.

Further, although the target position of the step motor is determined based on the number of revolutions per unit time of the engine (engine rotation) and the charging efficiency, there might take place a phenomenon that the recirculation rate of exhaust gas (EGR rate) becomes too high upon rapid acceleration, thereby providing problems of reduction in the engine rotational speed and tardiness in operation.

SUMMARY OF THE INVENTION

The present invention is intended to obviate the above-mentioned problems, and has for its object to provide an EGR valve control apparatus which is capable of controlling an EGR amount in an accurate and proper manner by using a step motor, thus improving the durability of an EGR valve.

In view of the above object, the present invention resides in an EGR valve control apparatus in which an opening of an EGR valve for opening and closing an exhaust gas recirculation passage connecting between an exhaust passage and an intake passage is adjusted discretely in a plurality of steps, and which comprises: a detecting section for detecting operating conditions of an internal combustion engine; a step motor target position calculating section for calculating a target position of a step motor in accordance with the operating conditions of the internal combustion engine detected by the detecting section; a difference calculating section for calculating a difference between a current position and the target position of the step motor; a hysteresis-provided drive control section for driving the step motor in accordance with the target position and performing control with hysteresis of two steps or more so as to hold the position of the step motor when a difference between the target position and the current position of the step motor is equal to or less than a prescribed n steps which is equal to or greater than two steps; and a forced drive control section for driving the step motor to the target position thereof while stopping the hysteresis-provided control when a deviation between the target position and the current position of the step motor remains for a predetermined period of time.

Preferably, the EGR valve control apparatus further comprises: a low speed operation determining section for determining whether a vehicle, on which the EGR valve control apparatus is installed, is at a low speed which is less than a prescribed low speed determination threshold; a rapid acceleration determining section for determining whether the vehicle is in a rapid acceleration state in which an acceleration of the vehicle is greater than a prescribed rapid acceleration determination threshold; and a follow-up speed slow-down drive control section for slowing down a follow-up speed of the step motor to follow the target position thereof which is calculated by the step motor target position calculating section in accordance with the operating conditions of the internal combustion engine when it is determined that the vehicle is in the rapid acceleration state during travelling at the low speed.

Preferably, the hysteresis-provided drive control section performs driving control with hysteresis of two steps so as to hold the position of the step motor when the difference between the target position and the current position of the step motor is equal to or less than two steps.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

Now, a preferred embodiment of the present invention will be described in detail while referring to the accompanying drawings.

Embodiment 1

Figure 1:
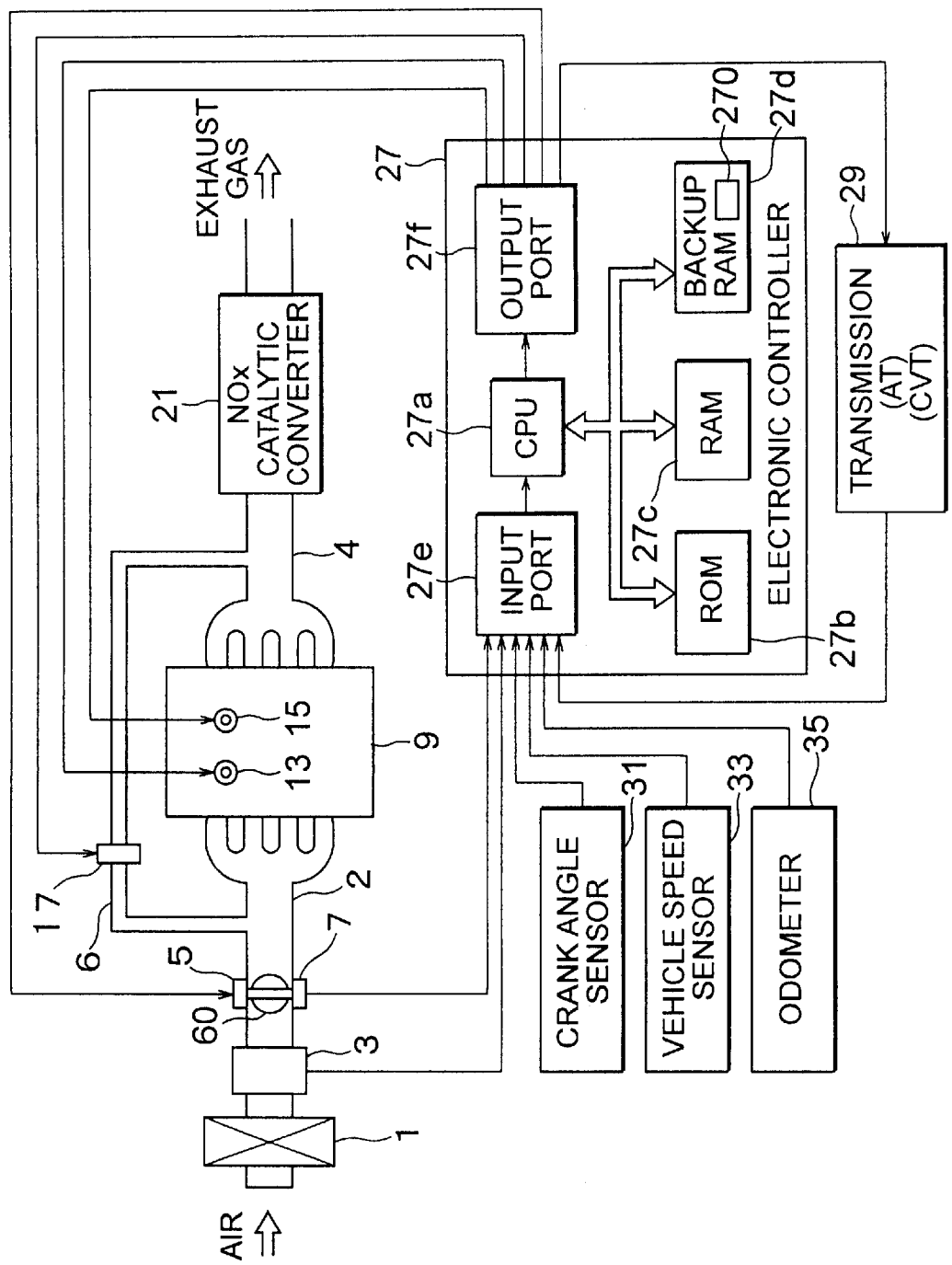
FIG. 1 is a view illustrating the entire control system for an internal combustion engine equipped with an EGR valve control apparatus according to the present invention.

FIG. 1 illustrates the entire construction of a control system for an internal combustion engine equipped with an EGR valve control apparatus according to the present invention. In FIG. 1, an air cleaner 1 is provided at an air intake side of an intake passage 2 for purifying air sucked therein. An airflow sensor 3 is mounted on the intake passage 2 downstream of the air cleaner 1 for detecting the amount of air flowing through the intake passage 2. A throttle drive motor 5 is connected with a throttle valve 60 mounted on the intake passage 2 for driving the throttle valve 60 so as to adjust the amount of air to be sucked into an internal combustion engine 9 through the intake passage 2. A throttle opening sensor 7 is mounted on the throttle valve 60 for detecting the opening of the throttle valve 60.

An injector 13 injects fuel into the internal combustion engine 9, and the fuel thus supplied to the internal combustion engine 9 is ignited, when compressed therein, by a sparking plug 15 to cause explosion. An exhaust gas recirculation (EGR) drive unit 17 is to control the amount of exhaust gas recirculated in an exhaust gas recirculation passage 6, related to the present invention, which connects between the exhaust passage 4 and the intake passage 2.

A catalytic converter 21 containing an NOx absorbent serves to purify the exhaust gas discharged from the engine 9 by absorbing the NOx components contained therein. An air-fuel ratio sensor (not shown) and a temperature sensor (not shown) are usually provided at an upstream side and at a downstream side, respectively, of the catalytic converter 21.

An electronic controller 27 is a control unit which comprehensively controls the operation of the internal combustion engine 9. The electronic controller 27 generally includes a CPU 27a, a ROM 27b for storing control programs, etc., a RAM 27c for storing data, etc., necessary for control, a backup RAM 27d, an input port 27e and an output port 27f, etc. Electrically connected to the electronic controller 27 are a transmission 29, a crank angle sensor 31, a vehicle speed sensor 33, an odometer 35, etc., in addition to the above-mentioned various sensors and the drive unit and motor.

Figure 2:
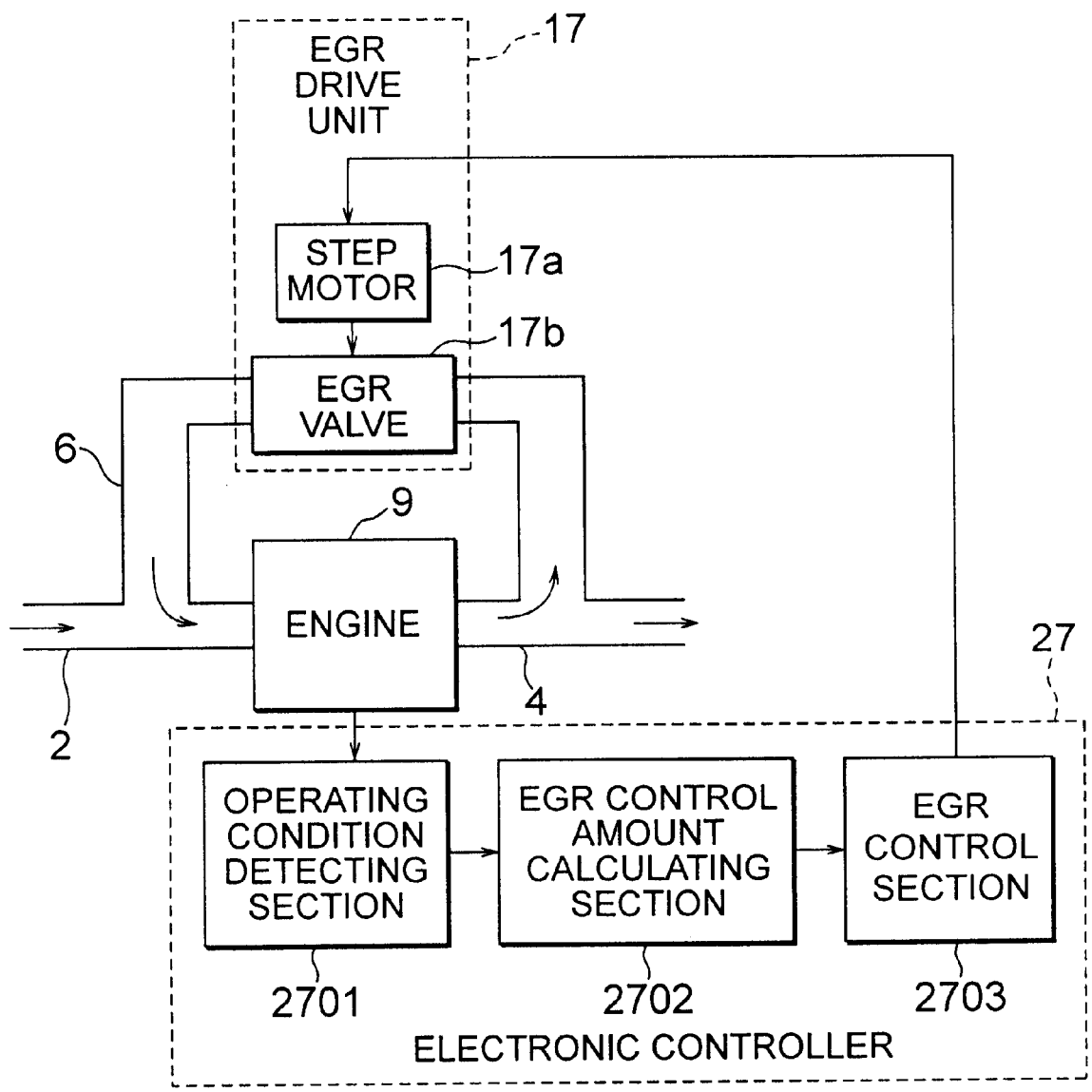
FIG. 2 is a view illustrating, in block form, only those parts of the internal combustion engine control system of FIG. 1 which are associated with the EGR valve control apparatus of the present invention.

FIG. 2 illustrates in block form only those portions of the internal combustion engine control system of FIG. 1 which are associated with the EGR valve control apparatus according to the present invention. The EGR drive unit 17 includes an EGR valve 17b and a step motor 17a for controlling the opening of the EGR valve 17b. The EGR drive unit 17 is controlled by a signal from the electronic controller 27 according to the results of detection of the respective sensors. The electronic controller 27 is roughly shown by functional blocks including an operating condition detecting section 2701, an EGR control amount calculating section 2702 and an EGR control section 2703.

Here, note that the operating condition detecting section 2701 includes an engine operating condition detecting section. Moreover, the EGR control amount calculating section 2702 includes a step motor target position calculating section, a difference calculating section, a low speed operation determining section, and a rapid acceleration determining section. In addition, the EGR control section 2703 includes a hysteresis-provided drive control section, a forced drive control section and a follow-up speed slow-down drive control section.

Figure 3:
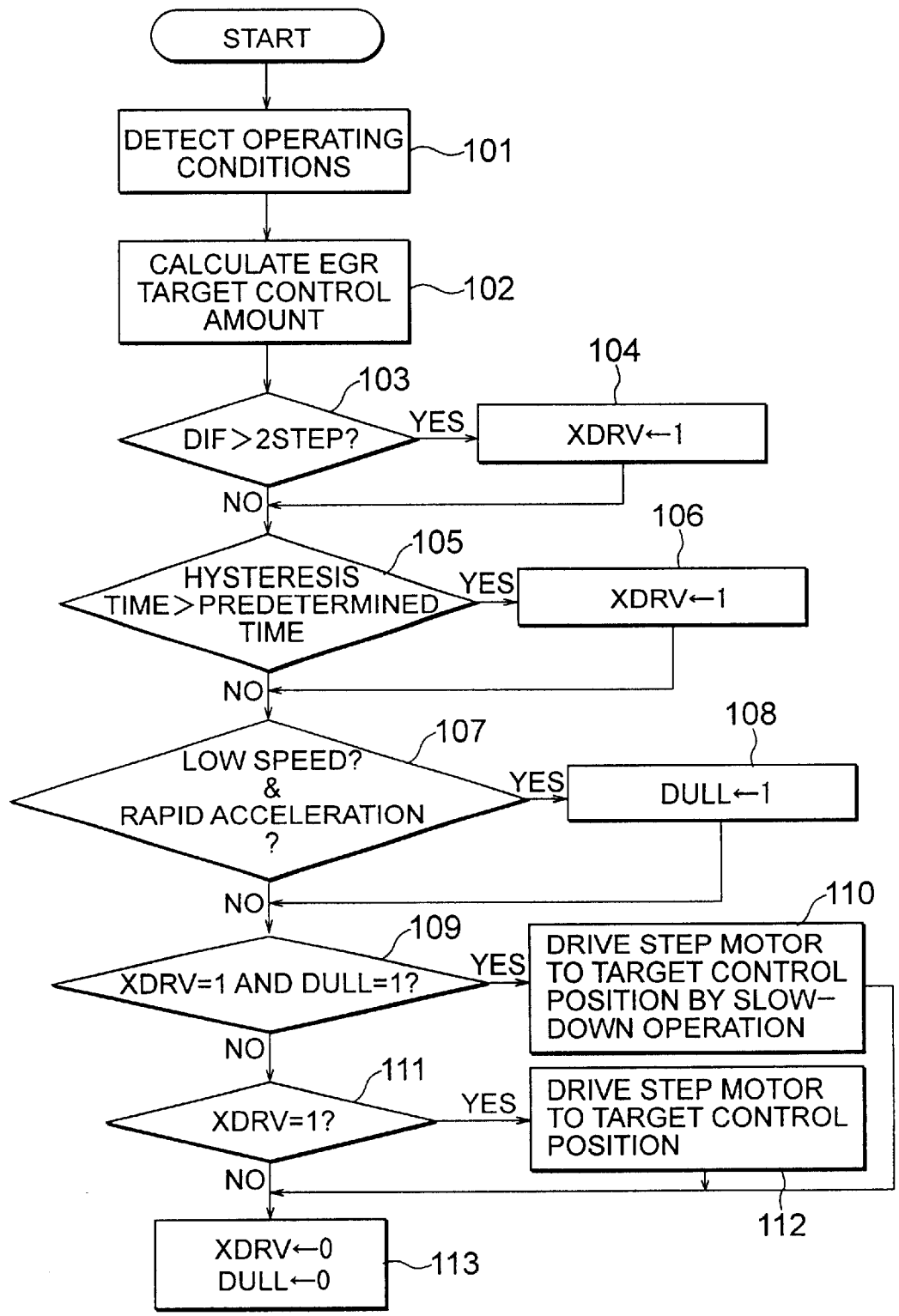
FIG. 3 is a flow chart illustrating the control operation of the EGR valve control apparatus of the present invention.

FIG. 3 is a flow chart illustrating control operations carried out by the operating condition detecting section 2701, the EGR control amount calculating section 2702 and the EGR control section 2703 of FIG. 2. Hereafter, reference will be made to the processing operation for controlling the EGR valve according to the present invention with reference to the flow chart of FIG. 3. A routine for control operations shown in FIG. 3 is executed every predetermined period of time.

When processing is shifted to this routine, first in step 101, the operating conditions of the internal combustion engine 9 are read in from the various sensors. Then in step 102, a target EGR control amount is calculated for the step motor corresponding to the operating conditions read in step 101. The target EGR control amount is determined based on the number of revolutions per unit time of the engine from the crank angle sensor 31 and the charging efficiency from the airflow sensor 3, for example, by looking up a map, designated at reference numeral 27, which is stored in advance in the backup RAM 27d.

Subsequently, in step 103, a difference DIF between the current position of the step motor 17a and the target position thereof calculated in step 102 is calculated, and it is determined whether this difference is greater than two steps. Here, note that the term "step" is defined as a step in the form of a rotational angle or its equivalent by which the rotational angle of the step motor is changed in a stepwise manner. Only when the result of the determination is that the difference is greater than two steps, step 104 is executed and a flag XDRV in the backup RAM 27d is set to "1".

After either step 103 or step 104, step 105 is executed where it is determined whether the period of time in which the difference between the target position and the current position of the step motor 17a is greater than two steps, i.e., a hysteresis period, exceeds a predetermined period of time. Only when the result of this determination is that the hysteresis period has exceeded the predetermined period of time, step 106 is executed where the flag XDRV in the backup RAM 27d is set to "1". Here, note that a timer (not shown) comprising a program in the electronic controller 27 may be used as a time measuring device for time measurement.

After either step 105 or step 106, step 107 is executed where it is determined based on the operating conditions read in step 101 whether the travelling speed of the vehicle is low (i.e., the vehicle speed is less than a prescribed low speed determination reference value or threshold) and whether the vehicle is in a rapid acceleration state (i.e., the acceleration of the vehicle is greater than a prescribed acceleration determination reference value or threshold). Only when the results of these determinations are that the vehicle speed is low and the vehicle acceleration is rapid, step 108 is executed where a flag Dull in the backup RAM 27*d* is set to "1". Here, note that for instance, a determination whether the vehicle speed is low or not can be made by a comparison between the signal from the vehicle speed sensor 33 and the low speed determination reference value or threshold, and a determination whether the vehicle acceleration is rapid or not can be made by a comparison between the signal from the airflow sensor 3 or the signal from the throttle angle sensor 7 and the rapid acceleration determination reference value or threshold.

After either step 107 or step 108, step 109 is executed where it is determined whether the flag XDRV is equal to "1" (XDRV=1) and whether the flag Dull is equal to "1" (Dull=1). Only when the results of the determinations are that the flag XDRV=1 and the flag Dull=1, step 110 is executed where the step motor 17*a* is driven to the target control position thereof calculated in step 102 while performing dull or slow-down control.

After either step 109 or step 110, step 111 is executed where it is determined whether only the flag XDRV is "1" (XDRV=1). Only when the result of the determination is that the flag XDRV=1, step 112 is executed where the step motor 17*a* is driven to the target control position thereof calculated in step 102.

After either step 111 or step 112, step 113 is executed where the flag XDRV is set to "0" (XDRV=0) and the flag Dull is set to "0" (Dull=0).

The control on the EGR valve is once ended, and control is shifted to the next operation.

Here, it is to be noted that although in the above-mentioned embodiment, control is performed with the provision of hysteresis of two steps in such a manner that in step 103, the flag XDRV is set to "1" when the difference DIF between the current position and the target position of the step motor 17*a* is greater than two steps, control may be effected with hysteresis of three steps or more in such a manner that the flag XDRV is set to "1" when the difference DIF is greater than three or four steps, depending upon situations.

In addition, regarding various detections in the above-mentioned processing operations, there are some other detection methods using different sensors, different tables, etc, and hence what has been illustrated and described herein is merely one example, and the present invention is not limited to this.

As described in the foregoing, according to the present invention, there is provided an EGR valve control apparatus in which an opening of an EGR valve for opening and closing an exhaust gas recirculation passage connecting between an exhaust passage and an intake passage is adjusted discretely in a plurality of steps, and which comprises: a detecting section for detecting operating conditions of an internal combustion engine; a step motor target position calculating section for calculating a target position of a step motor in accordance with the operating conditions of the internal combustion engine detected by the detecting section; a difference calculating section for calculating a difference between a current position and the target position of the step motor; a hysteresis-provided drive control section for driving the step motor in accordance with the target position and performing control with hysteresis of two steps or more so as to hold the position of the step motor when a difference between the target position and the current position of the step motor is equal to or less than a prescribed n steps which is equal to or greater than two steps; and a forced drive control section for driving the step motor to the target position thereof while stopping the hysteresis-provided control when a deviation between the target position and the current position of the step motor remains for a predetermined period of time. Thus, with the provision of hysteresis of two steps or more, sensitivity to the number of revolutions per unit time of the engine change, etc., is mitigated as compared with the prior art, thereby reducing fluttering of the EGR valve and hence improving the durability of the EGR valve. In addition, by compulsorily setting the position of the step motor to the target position if there remains a difference in the target position and the current position of the step motor for more than a predetermined period of time, more precise control can be achieved.

Moreover, the EGR valve control apparatus further includes: a low speed operation determining section for determining whether a vehicle, on which the EGR valve control apparatus is installed, is at a low speed which is less than a prescribed low speed determination threshold; a rapid acceleration determining section for determining whether the vehicle is in a rapid acceleration state in which an acceleration of the vehicle is greater than a prescribed rapid acceleration determination threshold; and a follow-up speed slow-down drive control section for slowing down a follow-up speed of the step motor to follow the target position thereof which is calculated by the step motor target position calculating section in accordance with the operating conditions of the internal combustion engine when it is determined that the vehicle is in the rapid acceleration state during travelling at the low speed. Thus, when the vehicle is rapidly accelerated during travelling at a low speed, by performing dull or slow-down processing in which the follow-up control of the EGR valve to the target position thereof is slowed down, it is possible to suppress the dropping or reduction in the number of revolutions per unit time of the engine as well as the tardiness (response delay) in engine operation, thereby improving driveability of the vehicle.

In addition, the hysteresis-provided drive control section performs driving control with hysteresis of two steps so as to hold the position of the step motor when the difference between the target position and the current position of the step motor is equal to or less than two steps. Thus, in particular, more precise control can be achieved while improving the durability of the EGR valve.

While the invention has been described in terms of a preferred embodiment, those skilled in the art will recognize that the invention can be practiced with modifications within the spirit and scope of the appended claims.

What is claimed is:

1. An EGR valve control apparatus in which an opening of an EGR valve for opening and closing an exhaust gas recirculation passage connecting between an exhaust passage and an intake passage is adjusted discretely in a plurality of steps, said EGR valve control apparatus comprising:

a detecting section for detecting operating conditions of an internal combustion engine;

a step motor target position calculating section for calculating a target position of a step motor in accordance with the operating conditions of said internal combustion engine detected by said detecting section;

a difference calculating section for calculating a difference between a current position and the target position of said step motor;

a hysteresis-provided drive control section for driving said step motor in accordance with the target position and performing control with hysteresis of two steps or more so as to hold the position of said step motor when a difference between the target position and the current position of said step motor is equal to or less than a prescribed n steps which is equal to or greater than two steps; and a forced drive control section for driving said step motor to the target position thereof while stopping the hysteresis-provided control when a deviation between the target position and the current position of said step motor remains for a predetermined period of time.

2. The EGR valve control apparatus according to claim 1, wherein said hysteresis-provided drive control section performs driving control with hysteresis of two steps so as to hold the position of said step motor when the difference between the target position and the current position of said step motor is equal to or less than two steps.

3. The EGR valve control apparatus according to claim 1, further comprising:

a low speed operation determining section for determining whether a vehicle, on which said EGR valve control apparatus is installed, is at a low speed which is less than a prescribed low speed determination threshold;

a rapid acceleration determining section for determining whether the vehicle is in a rapid acceleration state in which an acceleration of the vehicle is greater than a prescribed rapid acceleration determination threshold; and a follow-up speed slow-down drive control section for slowing down a follow-up speed of said step motor to follow the target position thereof which is calculated by said step motor target position calculating section in accordance with the operating conditions of said internal combustion engine when it is determined that the vehicle is in the rapid acceleration state during travelling at the low speed.

4. The EGR valve control apparatus according to claim 3, wherein said hysteresis-provided drive control section performs driving control with hysteresis of two steps so as to hold the position of said step motor when the difference between the target position and the current position of said step motor is equal to or less than two steps.

* * * * *